Sept. 6, 1960 C. H. KAMAN 2,951,544
ROTOR FOR A HELICOPTER
Filed Jan. 22, 1957 4 Sheets-Sheet 1
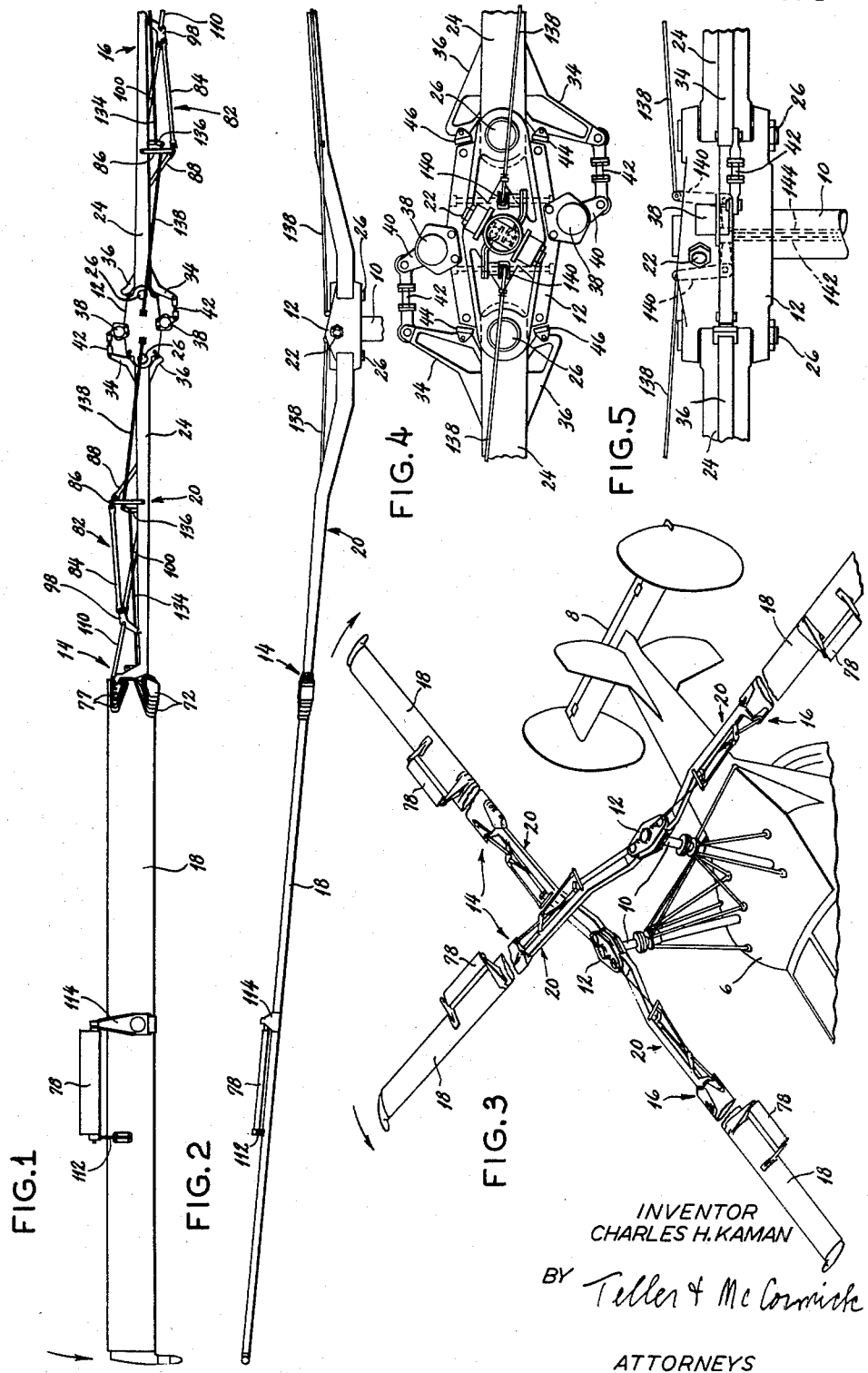
INVENTOR
CHARLES H. KAMAN
BY Teller & McCormick
ATTORNEYS

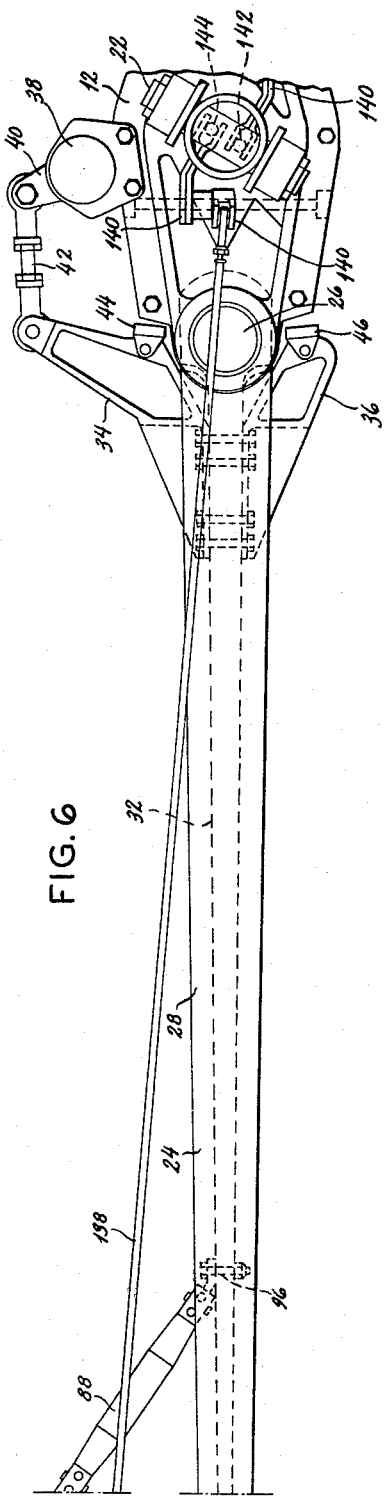

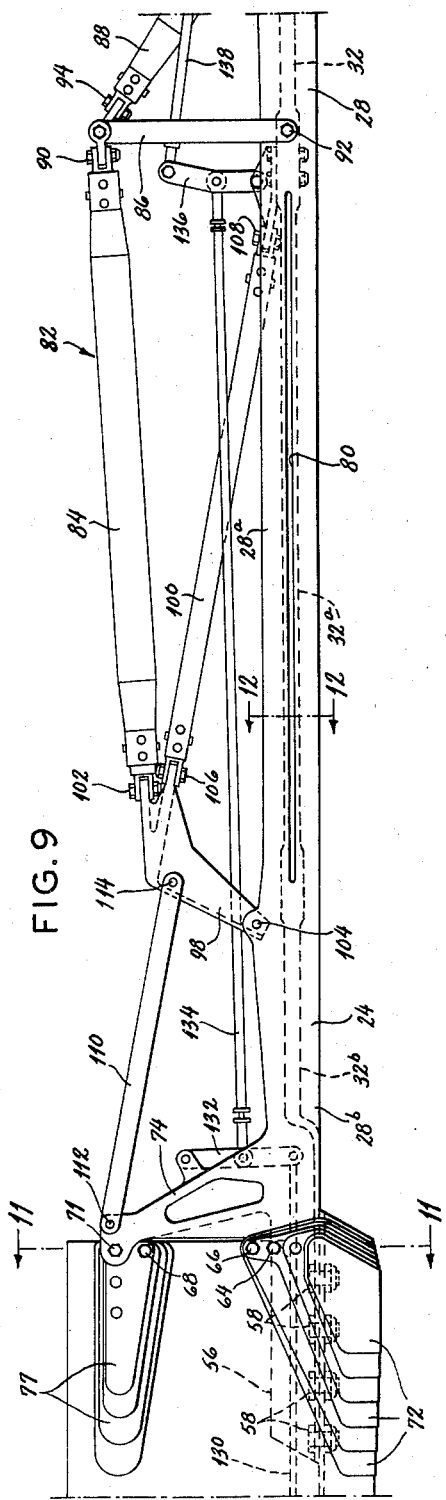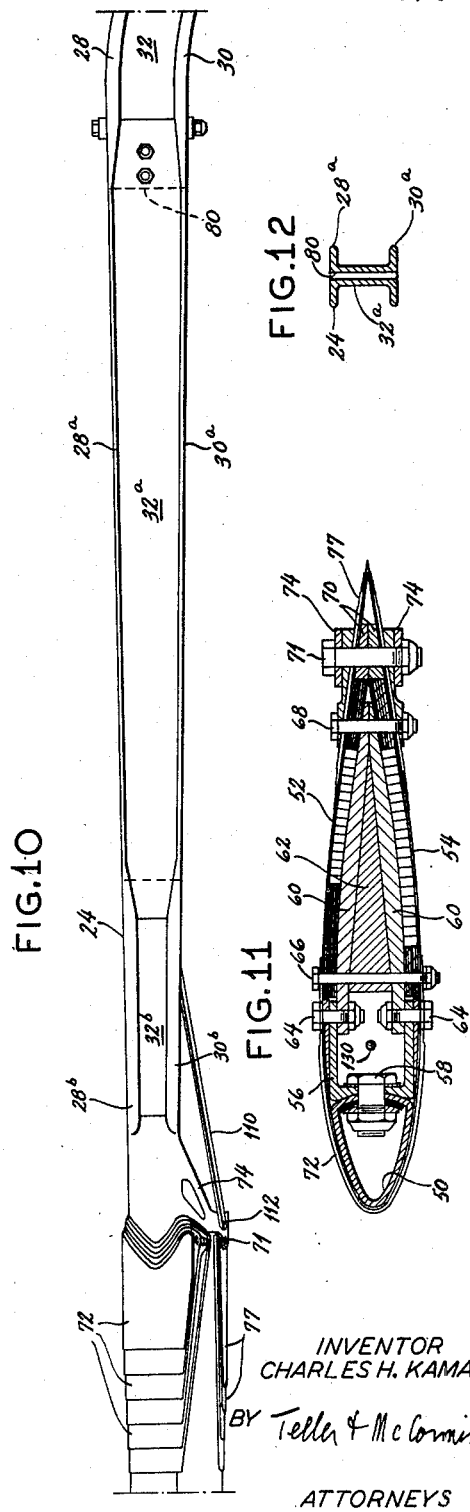

Sept. 6, 1960 C. H. KAMAN 2,951,544
ROTOR FOR A HELICOPTER
Filed Jan. 22, 1957 4 Sheets-Sheet 4
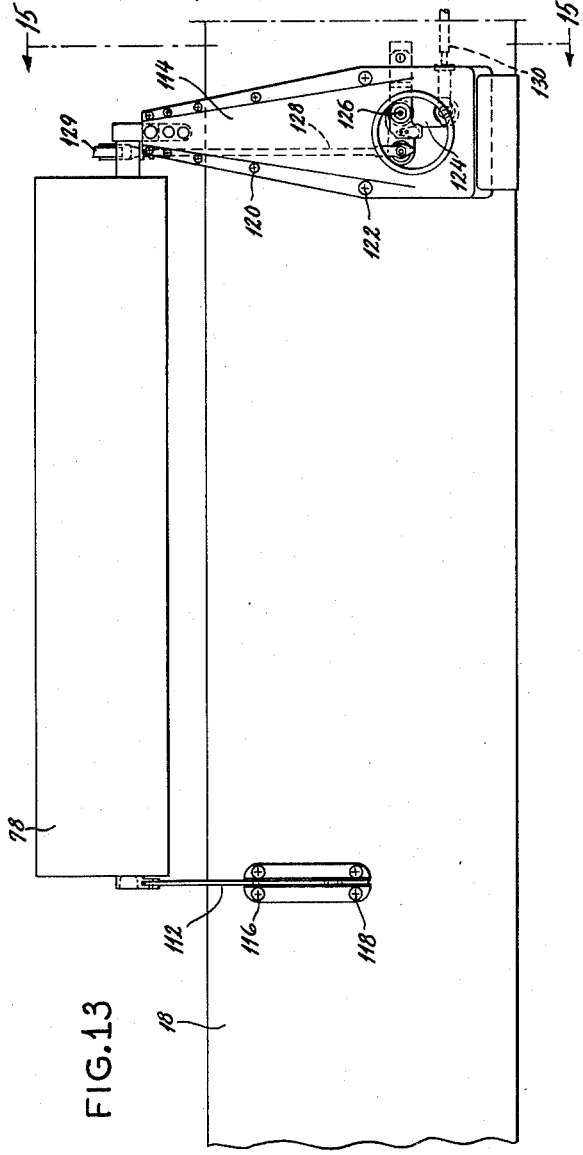
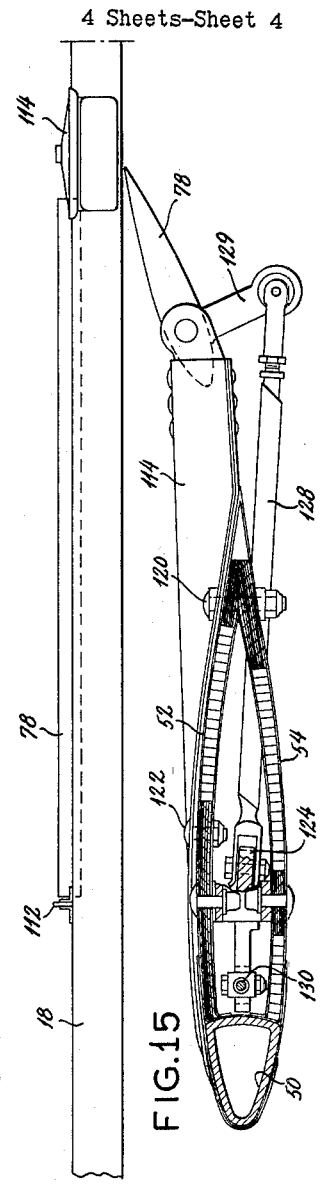
INVENTOR
CHARLES H. KAMAN
BY Teller &
McCormick
ATTORNEYS United States Patent Office 2,951,544
Patented Sept. 6, 1960

2,951,544
ROTOR FOR A HELICOPTER

Charles H. Kaman, Simsbury, Conn., assignor to The Kaman Aircraft Corporation, Bloomfield, Conn., a corporation of Connecticut Filed Jan. 22, 1957, Ser. No. 635,472

8 Claims. (Cl. 170—160.24)

The invention relates to a rotor for a helicopter, and more particularly for a helicopter of the type disclosed in the Kaman Patent No. 2,455,866, dated December 7, 1948, and entitled Aircraft of Rotary Wing Type and shown in the Kaman and Stevens Patent No. 2,695,674, dated November 30, 1954, and entitled Control System for Multiple Rotor Helicopter. Reference is made more particularly to the last said patent for any details of rotor mounting and control that are not herein fully disclosed.

In a helicopter of the type shown in said patents a substantially vertical power driven shaft is connected with the fuselage and the rotor is connected with said shaft. Each blade of the rotor is connected with the shaft for rotation therewith and is so held as to prevent rotative movements of the root portion thereof about an axis extending longitudinally of the blade, each blade has substantial torsional flexibility for permitting twisting about its longitudinal mean axis and with respect to its non-rotatable root portion and has torsional resiliency causing it to be restored to its normal shape after such twisting, and an aerofoil flap is carried by the outer portion of each blade and is angularly movable relatively thereto about an axis substantially parallel with said longitudinal axis of the blade which flap serves by reason of aerodynamic forces acting thereon during rotation to twist the blade progressively from the said root portion to the said flap and to thereby change the effective blade pitch to varying substantial extents dependent on varying relative angular positions of the flap. The reasons for and the advantages of the described flap control of the blade for torsionally effecting changes in pitch are fully set forth in the said patents and need not be here stated.

Each blade of the rotor as specifically disclosed in said patents was formed chiefly of wood and was therefore readily subject to torsional deformation or twisting throughout its length. It is sometimes desirable for various reasons to form the rotor blades, or at least the aerofoil lifting sections thereof, of a material such as metal that is substantially more resistant to torsional deformation or twisting. When such a material is used, the degree of torsional flexibility in the main body of the blade would not ordinarily be sufficient to permit the twisting required to provide the pitch changes necessary for helicopter control as described in said patents, and the principal object of the invention is to provide means for augmenting the limited twisting that takes place in the aerofoil lifting section of the blade. To this end a connecting section is interposed between the aerofoil lifting section of the blade and the root portion thereof, said connecting section being so constructed that at least a portion thereof has relatively low torsional resistance or relatively great torsional flexibility and is more readily subject to twisting but nevertheless has such resiliency that it returns to its normal shape after twisting. The limited twisting that occurs in the aerofoil lifting section is combined with the greater twisting that occurs in the connecting section and the total twisting provides the pitch changes necessary for the control of the helicopter.

Further objects of the invention are to provide various details of construction and arrangement which facilitate the attainment of the above-stated principal object.

The drawings show in detail a preferred embodiment of the invention, but it will be understood that various changes may be made from the construction shown, and that the drawings are not to be construed as defining or limiting the scope of the invention, the claims forming a part of this specification being relied upon for that purpose.

Of the drawings:

Fig. 1 is a plan view of a portion of a helicopter rotor to which the invention more particularly relates.

Fig. 2 is a side view of the rotor portion shown in Fig. 1.

Fig. 3 is a perspective view of the upper portion of a helicopter having two rotors such as that shown in Figs. 1 and 2.

Fig. 4 is an enlarged plan view of the drive shaft and rotor hub and certain directly associated parts as shown in Fig. 1.

Fig. 5 is a side view of the parts shown in Fig. 4.

Fig. 6 is an enlarged top view of the inner portion of one blade and of a portion of the hub.

Fig. 7 is a side view of the blade and hub portions shown in Fig. 6.

Fig. 8 is a transverse sectional view taken along the line 8—8 of Fig. 7.

Fig. 9 is an enlarged top view of an intermediate portion of one blade, this view being taken in the direction of the arrows A, A in Fig. 2.

Fig. 10 is a side view of the blade portion shown in Fig. 9.

Fig. 11 is a transverse vertical sectional view taken along the line 11—11 of Fig. 9, but for convenience of illustration the blade is shown without pitch.

Fig. 12 is a transverse vertical sectional view taken along the line 12—12 of Fig. 9.

Fig. 13 is an enlarged top view of the outer portion of one blade, this view being taken in the direction of the arrows A, A in Fig. 2.

Fig. 14 is a side view of the blade portion shown in Fig. 13.

Fig. 15 is a tranvserse vertical sectional view taken along the line 15—15 of Fig. 13, but for convenience of illustration the blade is shown without pitch.

A helicopter as shown in the aforesaid patents has two similar rotors in side-by-side intermeshing relationship as shown in Fig. 3, but the present invention is not necessarily so limited. Said Fig. 3 shows two rotors connected with a fuselage 6 provided with an empennage 8. When there are two rotors, the shafts 10, 10 therefor are not vertical but are in upwardly diverging positions. The shafts are connected for rotation in unison and in opposite directions and the two rotors are so connected with the shafts that the blades of each rotor are longitudinal when those of the other rotor are transverse. This enables said rotors to intermesh during rotation.

With the exception of said Fig. 3, the drawings show only one shaft and only one rotor and for simplicity of illustration, it has been assumed that the shaft is vertical.

Referring more particularly to Figs. 1 to 5 of the drawings, 10 represents one of the said shafts, this shaft being tubular. A hub 12 is connected with the shaft and rotor blades are connected with the hub. The shaft 10 is normally power driven, but the driving connections for said shaft are such that the shaft may rotate in its normal direction independently of the motor so as to permit autorotation of the rotor. The invention is not necessarily limited as to the number of blades, but two blades are preferred and are shown, said blades being designated 14 and 16. Each blade includes an outer aerodynamically effective or aerofoil section 18 and an inner connecting section 20 interposed between said aerofoil section 18 and the hub 12, said connecting section having little or no aerodynamic function. Said blade sections 18 and 20 are rigidly connected with each other at least as concerns upward and downward flexing. The root portion of each blade at the inner end of the section 20 thereof is so connected with the hub as to prevent rotative movement of said root portion about an axis extending longitudinally of the blade.

Extending through horizontal holes in the upper part of the tubular shaft 10 is a horizontal pivot or teeter pin 22, having its end portions projecting beyond the shaft. The hub or hub member 12 is provided having a large central aperture through which the upper end of the shaft extends. Bearings, not shown in detail, are provided on the hub member 12, these bearings serving to connect said hub member with the pin 22 for pivotal or teetering movement about the axis of the pin. The pin 22 and said bearings are so located that the axis of pivotal movement is at an acute angle, preferably about 60°, with respect to the longitudinal axes of the blades 14 and 16. It is assumed that the shaft and the rotor rotate in the counterclockwise direction as viewed in Fig. 1. The said teeter axis angle is such that each teeter bearing and the corresponding end of the pin 22 is at the leading side of the longitudinal axis of the corresponding adjacent blade.

Each blade connecting section 20 is hereinafter described in detail, and it includes a main connecting member 24 which is connected with the hub member 12 for pivotal movement about the corresponding one of two vertical lead-lag axes provided by vertical lead-lag pivot pins 26, 26 as shown in Figs. 4 and 5. The pins 26, 26 are preferably rigidly connected with the members 24, 24 for the two blades and suitable bearings are provided between the pivot pins and the hub member. The sections 20 of the two blades are so formed and connected that they cooperate with the pins 26, 26 to hold the blade sections 18 at positive dihedral angles as shown. The hub and the two blades are movable in unison about the horizontal axis of the teeter pin 22.

Said pins 26, 26 constitute pivotal connection devices to which the inner connecting sections 20 of the blades are connected for movements about the lead-lag axes, and said pins also serve to prevent any rotative movement of the root portions of the blades about axes extending longitudinally of the blades.

Preferably the connecting members 24 of the two blades have upward offsets therein as best shown in Fig. 2. Said off-sets bring the blade portions 18 above the level of the hub 12, this being advantageous in avoiding any interference of the blades of one rotor with those of another rotor when there are two rotors as shown in Fig. 3.

The main member 24 of the connecting section 20 of the blade 14 is shown in detail in Figs. 6 to 10. Preferably, but not necessarily, said member is generally I-shaped in cross section as shown in Figs. 8 and 12, the flanges 28 and 30 of the member preferably being at the top and bottom thereof and being approximately horizontal and the central web 32 of said member being vertical. Said member 24 is provided at its inner end with an integral boss apertured for receiving the corresponding lead-lag pin 26 and for pivotal movement thereon.

Connected with the member 24 are opposite arms 34 and 36 which are shown as structurally separate and as being bolted to the central web 32 of said member. Interposed between the arm 34 and the hub member 12 is a lead-lag damper 38 which may be either frictional or hydraulic. As shown, the damper is frictional and it has a body which is connected to the hub member and also has a pivotally movable arm 40 projecting from the body. Said arm 40 is connected by a link 42 with said arm 34. The arm 40 is movable only in opposition to frictional resistance, and it serves in cooperation with the link 42 and the arm 34 to resistor dampen pivotal movements of the blade about the lead-lag axis.

The arms 34 and 36 are respectively provided with stops 44 and 46 which are engageable with shoulders on the hub member 12 to limit movements about the lead-lag pin 26. The stop 44 limits relative pivotal movement in the trailing or lagging direction and the stop 46 limits relative pivotal movement in the leading direction.

The outer aerofoil lifting section 18 of each blade, instead of being formed of wood as disclosed in said patents, is preferably formed entirely of metal and is hollow. The metal blade has only limited twistability.

The details of the structure of said metal blade section 18 do not constitute any part of the present invention, but as shown in Fig. 11 said blade section comprises a hollow longitudinal spar 50 along the leading edge and further comprises upper and lower walls 52 and 54 each of which consists of honeycomb material between outer and inner metallic sheets.

The inner end of the aerofoil blade section 18 is rigidly connected with the outer end of the connecting member 24 in such a manner as to prevent any relative movement between them about an axis extending longitudinally of the blade. When the blade section 18 is constructed as described, the connecting member 24 preferably has an integral U-shaped extension 56 which projects into said blade section at the rear of the spar 50 as shown in Fig. 11. The extension 56 is connected with the spar 50 by means of bolts 58, 58. At the rear of the extension 56 the blade section 18 is reinforced by filler members 60, 60 and 62 held in place by bolts 64, 64, 66 and 68. Adjacent the trailing edge of the blade section 18 are filler members 70 held in place by a bolt 71. The connection between the member 24 and the blade section 18 is preferably covered by generally U-shaped overlapping metallic plates 72 which are bonded to the blade section 18 and to the member 24 and are further held in place by said bolts 64, 64 and 66.

In order to provide increased resistance to lateral bending or flexing, the member 24 is shown as being formed with an integral rearward extension 74 which is bifurcated at the rear to fit above and below the inner trailing corner of the blade section 18. Said extension 74 is connected with said blade section by said bolt 71. Overlapping metallic plates 77, 77 similar to the plate 72 may be provided between said blade section and the bifurcations of the extension 74.

From the foregoing description it will be observed that the connecting section 20 of each blade is a self-contained structure having a unitary outer portion 56, 74 and a unitary root portion 34 and having all of its parts fixedly connected directly with each other independently of the aerofoil section 18 of the blade and independently of the hub 12 and of the corresponding pivotal connection device 26. Each blade includes means such as 58, 71 at the unitary outer end 56, 74 of the connecting section 20 for rigidly connecting said end portion with the lifting section 18 and includes means at the unitary root portion 34 of the connecting section 20 for engaging the corresponding pivotal connection device 26 so as to prevent any rotative movement of said root portion about an axis extending longitudinally of the blade. Said connecting section 20 of each blade together with the connecting means 58, 74 thereof and the corresponding pivotal connection device 26 are constructed and arranged to constitute the sole support for the lifting section 18 of said blade.

In accordance with the invention, the outer aerofoil section 18 of each blade is provided with a trailing aerofoil flap 78 adjustable about an axis extending longitudinally of the blade. Said flap 78 when properly adjusted serves during rotor rotation to apply aerodynamic forces which serve to twist the blade progressively from its root portion to said flap and to thereby change blade pitch. The major portion of the twisting is in the connecting section 20 of the blade, this section having much greater torsional flexibility than does the aerofoil section 18. The means for moving said flap to enable it to effect said twisting are hereinafter more fully described.

As to the details of the connecting section 20 that provides additional torsion flexibility, there may be wide variation. The presently prefered details will be now described. As has been stated, said member 24 of said blade section 20 is preferebaly I-shaped. Whether I-shaped or otherwise, said member preferably has inner and outer zones each of substantial length. Said member in one of said zones has only slight torsional flexibility to permit twisting about the longitudinal axis of the blade and said member in the other of said zones has much greater torsional flexibility to permit twisting about said longitudinal axis, said member in the last said zone having torsional resilience tending to restore it to normal shape after twisting. Preferably it is in the inner zone that said member has only slight torsional flexibility and it is in the outer zone that said member has substantial torsional flexibility.

When said member is I-shaped as is preferred, it is preferably positioned with its flanges horizontal and with its web vertical. The I-shape makes said member 24 highly resistant to vertical flexing and it is well adapted for transmitting the lift from the blade section 18 to the hub. The inner portion of said member 24 preferably tapers in the outward direction both as to the width of its flanges 28 and 30 and as to the thickness of its web 32. Most of the outer portion of said member 24 has its flanges 28a and 30a of uniform relatively narrow width, said flanges 28a and 30a preferably being thinner than the flanges 28 and 30. Said outer portion has its web 32a of uniform relative small thickness. As the result of the foregoing, the inner zone of said member 24 has a cross sectional area substantially greater than that of the outer zone. At the extreme outer portion of the member 24 the web 32b has the same thickness as the thinner portion of the web 32 and the flanges 28b and 30b have the same thicknesses as the flanges 28 and 30.

The member 24 is to some extent twistable throughout its entire length, but as before stated it preferably has a a zone of substantial length wherein it has increased twistability or torsional flexibility. To provide such a zone a vertical slot 80 of considerable length is cut in said member and is preferably cut perpendicularly to the flanges 28a and 30a of said member and through the relatively small web 32a thereof, said slot being shown in Figs. 9, 10 and 12. As the result of said slot 80, the portions of the web 32a at the sides of the slot are very thin. In the portion or zone of the member 24 corresponding to the length of the slot 80, the leading and trailing portions of the flanges 28a and 30a are separated from each other by said slot and said portion or zone of said member is relatively weak torsionally and therefore has greatly increased twistability.

The slot 80 which torsionally weakens the corersponding zone of the member 24 to provide increased twistability does not substantially weaken said zone of the member as concerns resistance to vertical flexing. Notwithstanding the slot, the member 24 has ample strength to carry the lift of the blade and to transmit said lift to the hub. However, said slot 80 unavoidably weakens the corresponding zone of the member 24 as concerns lateral flexing and without reinforcement at said zone said member might be too weak to properly transmit the lateral or rotative forces necessary for driving the blade. Preferably the member 24 is provided with means which reinforce it at the last said zone so as to provide additional lateral strength without materially reducing twistability.

As shown, the reinforcing means for said zone is a truss 82, shown in Figs. 1 and 9. The details of the truss 82 may be widely varied, but as shown it comprises a tension compression member 84, preferably tubular, which is approximately parallel with the said weakened portion of the member 24 and is spaced in the trailing direction therefrom. The member 84 is connected at its inner end with braces 86 and 88 which are connected respectively with the member 24 near the inner end of said slot 80 and at a point between said inner end of said slot and the hub. The member 82 has a horizontal pivotal connection at 90 with said brace 86 and said brace 86 has a vertical pivotal connection at 92 with said member 24 and has a horizontal pivotal connection at 94 with said brace 88. Said brace 88 has a horizontal pivotal connection at 96 with said member 24. The member 84 is connected at its outer end with braces 98 and 100 which are connected respectively with the member 24 near the outer end of said slot 80 and near the inner end of said slot. The member 84 has a horizontal pivotal connection at 102 with said brace 98 and said brace 98 has a vertical pivotal connection at 104 with said member 24 and has a horizontal pivotal connection at 106 with said brace 100. Said brace 100 has a horizontal pivotal connection at 108 with said member 24.

The truss 82 preferably also comprises upper and lower links 110, 110 connected at 112 to the trailing end of the extension 74 on the member 24 and connected at 114 to the trailing end of the brace 98.

It will be obvious that the truss 82 reinforces the weakened outer portion of the member 24 with respect to lateral bending, but said truss by reason of its several horizontal and vertical pivotal connections offers little or no resistance to twisting. It will be observed that the truss 82 is almost entirely behind the member 24, that is, at the trailing side thereof, and it therefore offers little or no additional aerodynamic resistance to rotative movement of the blade.

The flap 78 is pivotally connected with the blade section 18 by means of two outboard and inboard brackets 112 and 114 which project rearwardly from said blade section. The outboard bracket 112 is held in place by bolts 116 and 118 as shown in Fig. 13, and the inboard bracket 114 is held in place by similar bolts 120 and 122 as shown in Figs. 13 and 15. Associated with the bracket 114 is a bell crank 124 located within the hollow blade section and movable about a vertical axis at 126. A transverse link 128 connects one arm of the bell crank with a horn 129 depending from the flap 78. A longitudinal push-pull rod 130 is connected with the other arm of the bell crank and extends toward the hub.

As shown in Fig. 15 the flap 78 has a negative pitch angle and during rotor rotation it tends to move downwardly and to cause the trailing edge of the blade to move downwardly. Downward movement of the trailing edge increases the positive pitch of the blade. With the parts in the Fig. 15 position it may be assumed that the downward force applied at the trailing edge has already twisted the blade in the clockwise direction to an extent commensurate with the force that has been applied with a resulting equilibrium. Clockwise adjustment of the flap 78 decreases said applied force and permits the blade to partly untwist with a resultant decrease in blade pitch angle. Such clockwise adjustment is effected by inward movement of the push-pull rod 130. Counterclockwise adjustment of the flap 78 increases said applied force and causes the blade to additionally twist with a resultant increase in blade pitch angle. Such counterclockwise adjustment is effected by outward movement of the push-pull rod 130.

As shown in Fig. 9, the inner end of the push-pull rod 130 is connected with a lever 132 pivoted to the extension 74 on the member 24. Connected with said lever 132 is a second push-pull rod 134 which extends inwardly and is connected at its inner end with a lever 136 pivoted to the member 24. Connected with said lever 136 is a third push-pull rod 138 which extends inwardly. As shown in Fig. 6 and in Figs. 4 and 5, the inner end of the push-pull rod 138 is connected with one arm of a bell crank 140 pivoted to the hub member 12 for movement about a horizontal axis. The other arm of the bell crank 140 extends within the hollow shaft 10 and is there connected with a vertically movable rod 142. A second vertically movable rod 144 similar to the rod 142 is also located within the shaft 10, this second rod being connected with the flap of the other blade of the rotor by means that are duplicates of those for the flap 78. When the rods 142 and 144 are moved downwardly, the several push-pull rods are moved inwardly and the flaps are moved to decrease the pitch angles of the blades. When the rods 142 and 144 are moved upwardly, the several push-pull rods are moved outwardly and the flaps are moved to increase the pitch angles of the blades.

The mechanism for moving the rods 142 and 144 may be that shown and described in said Patent No. 2,695,674 for moving similar rods. By said mechanism the rods may be moved during rotor rotation to change the blade pitches collectively or cyclically or both.

The invention claimed is:

1. For use in a helicopter having a fuselage and a substantially vertical power driven shaft, a rotor including in combination, a hub adapted to be connected with said shaft, a plurality of similar pivotal connection devices on the hub equally spaced circumaxially and having approximately vertical pivotal axes, a plurality of similar radially extending blades equally spaced circumaxially and each including an outer aerofoil lifting section and each blade also including an inner connecting section interposed between the lifting section and a corresponding pivotal connection device which connecting section is a self-contained structure highly resistant to vertical flexing and having a unitary outer portion and a unitary root portion and having all of its parts fixedly connected directly with each other independently of the aerofoil section of the blade and independently of the hub and the corresponding pivotal connection device, said blade also including means at the unitary outer end portion of the connecting section for rigidly connecting said end portion with the lifting section and means at the unitary root portion of the connecting section for engaging said corresponding pivotal connection device so as to permit pivotal movement of the blade in its entirety about the axis of said device and so as to prevent any rotative movement of said root portion of the blade about an axis extending longitudinally of the blade, said connecting section of each blade together with said connecting means and the corresponding pivotal connection device being constructed and arranged to constitute the sole support for the lifting section of each blade, said aerofoil section of each blade having only slight torsional flexibility for permitting twisting about the longitudinal blade axis and the connecting section of each blade having much greater torsional flexibility for permitting twisting about said longitudinal blade axis and said aerofoil and connecting sections having inherent torsional resiliency causing them to be restored to their normal shapes after twisting, a plurality of similar aerofoil flaps carried respectively by said aerofoil sections of the blades at positions widely spaced from the inner ends of said sections which flaps are angularly movable relatively to said aerofoil sections about axes substantially parallel with said longitudinal axes of the blades and which flaps serve by reason of aerodynamic forces acting thereon during rotation to twist the respective blades chiefly at said connecting sections thereof and to thereby change the effective pitches of said aerofoil sections to varying substantial extents dependent on varying relative angular positions of the flaps, and relatively movable flap moving connections extending from said flaps to the hub and adapted to be connected with actuating mechanism on the fuselage for angularly moving said flaps relatively to their respective blades during rotor rotation.

2. For use in a helicopter having a fuselage and a substantially vertical power driven shaft, a rotor including in combination, a hub adapted to be connected with said shaft, a plurality of similar radially extending blades equally spaced circumaxially and each including an outer aerofoil lifting section having only slight torsional flexibility about the longitudinal mean axis of the blade and each also including an inner connecting member which is rigidly connected at its outer end with the corresponding aerofoil section so as to constitute the sole support therefor and which has means at its inner root portion that connects it with the hub and prevents any rotative movement of said root portion about an axis extending longitudinally of the blade, each said connecting member having inner and outer zones each of substantial length, the last said member in one of said zones having only slight torsional flexibility for permitting twisting about said longitudinal axis and said member in the other of said zones having substantial torsional flexibility for permitting twisting about said longitudinal axis and with respect to said root portion and said member having inherent torsional resiliency causing it to be restored to its normal shape after twisting, a plurality of similar aerofoil flaps carried respectively by said aerofoil sections of the blades and angularly movable relatively thereto about axes substantially parallel with said longitudinal axes of the blades which flaps serve by reason of aerodynamic forces acting thereon during rotation to twist the respective blades chiefly at the first said zone of said connecting member and to thereby change the effective pitches of said aerofoil sections to varying substantial extents dependent on varying relative angular positions of the flaps, and relatively movable flap moving connections extending from the flaps to the hub and adapted to be connected with actuating mechanism on the fuselage for angularly moving said flaps relatively to their respective blades during rotor rotation.

3. A rotor as set forth in claim 2, wherein said connecting member is capable of only slight twisting in the inner zone thereof and is capable of substantially greater twisting in the outer zone thereof.

4. For use in a helicopter having a fuselage and a substantially vertical power driven shaft, a rotor including in combination, a hub adapted to be connected with said shaft, a plurality of similar pivotal connections on the hub equally spaced circumaxially and having approximately vertical pivotal axes, a plurality of similar radially extending blades equally spaced circumaxially and each including an outer aerofoil lifting section and an inner connecting member in the form of an I-beam which is rigidly connected at its outer end with the corresponding aerofoil section so as to constitute the sole support therefor and which is engaged at its inner root portion with a corresponding pivotal connection device on the hub so as to be relatively movable about the corresponding vertical pivotal axis which pivotal connection device serves to prevent any rotative movements of said root portion of the I-beam about an axis extending longitudinally of the blade, said I-beam of each blade being provided with inner and outer zones with the outer zone having a cross sectional area substantially less than that of the inner zone to facilitate substantial twisting of said I-beam about the longitudinal mean axis of the blade and with respect to said root portion and said I-beam having inherent torsional resiliency causing it to be restored to its normal shape after twisting, a plurality of similar aerofoil flaps carried respectively by said aerofoil sections of the blades at positions widely spaced from the inner ends of said sections which flaps are angularly movable relatively to said aerofoil sections about axes substantially parallel with said longitudinal axes of the blades and which flaps serve by reason of aerodynamic forces acting thereon during rotation to twist the respective blades chiefly at said connecting sections thereof and to thereby change the effective pitches of said aerofoil sections to varying substantial extents dependent on varying relative angular positions of the flaps, and relatively movable flap moving connections extending from said flaps to the hub and adapted to be connected with actuating mechanism on the fuselage for angularly moving said flaps relatively to their respective blades during rotor rotation.

5. A rotor as set forth in claim 4, wherein the I-beam of said connecting member of each blade has a slot therein throughout its said outer zone to provide increased capability of twisting in said zone.

6. A rotor as set forth in claim 5, wherein the I-beam of said connecting member of each blade has its flanges at the top and bottom and substantially horizontal and has its web substantially vertical, and wherein said slot extends vertically between said flanges and through said web.

7. A rotor as set forth in claim 4, wherein said connecting member of each blade includes means extending throughout the length of said slot in said I-beam and serving to reinforce said member with respect to lateral flexing.

8. A rotor as set forth in claim 7, wherein said reinforcing means is a truss spanning said slot.

References Cited in the file of this patent

UNITED STATES PATENTS

| | | |
|---|---|---|
| 2,600,531 | Hafner | June 17, 1952 |
| 2,757,745 | Verhage et al. | Aug. 7, 1956 |

FOREIGN PATENTS

| | | |
|---|---|---|
| 807,110 | France | Jan. 5, 1937 |